United States Patent Office 3,682,618
Patented Aug. 8, 1972

3,682,618
PHENYLUREAS AS PLANT GROWTH MODIFIERS
William D. Mitchell and Edward J. Soboczenski, Chadds Ford, Pa., assignors to E. I. du Pont de Nemours and Company, Wilmington, Del.
No Drawing. Filed July 15, 1969, Ser. No. 841,966
Int. Cl. A01n 9/20
U.S. Cl. 71—120
4 Claims

ABSTRACT OF THE DISCLOSURE

A group of phenylureas when applied to various plants at flowering result in an increase in the number and size of fruit set, thereby increasing the yield.

BRIEF SUMMARY OF THE INVENTION

A group of phenylureas are useful as plant growth regulants. These phenylureas are represented by the following structure:

Formula I

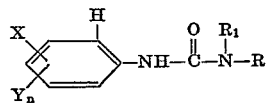

wherein

X is hydrogen, halogen, alkyl of 1 through 2 carbon atoms, hydroxy, alkoxy of 1 through 2 carbon atoms, trifluoromethyl, carboxy, alkoxycarbonyl of 2 through 3 carbon atoms, or alkoxycarbonylmethyl of 3 through 4 carbon atoms;
Y is hydrogen, bromine, chlorine, iodine, methyl or nitro;
$n$ is 1 or 2;
R is hydrogen, or alkyl of 1 through 4 carbon atoms;
$R_1$ is hydrogen or methyl.

Preferred because of their greater safety to plants are those compounds where $R_1$ is methyl, $n$ is 1 and at least one of X and Y are other than hydrogen and X and Y are in the 3 and 5 positions of the phenyl ring, and most preferred are those compounds where $R_1$ is methyl, $n$ is 1 and X and Y are other than hydrogen and in the 3 and 5 positions of the phenyl ring.

The above compounds are particularly active in improving the yield by promoting the fruit set and increasing the size of fruits on crops such as grapes, peaches, cherries, plums, blueberries, cranberries, apples, citrus fruit, strawberries, pears, prunes, apricots, nectarines, beans, peas, soybeans, tomatoes, melons, other cucrubits, peanuts, wheat, rice and corn. The compounds are applied to the florets, foliage, or both at the time of anthesis, at growth regulating amounts which vary from 50 to 2,000 p.p.m.

DESCRIPTION OF THE INVENTION

Phenylureas of the type which are useful for the herein described utility are well known to those skilled in the art. These compounds can be prepared by conventional methods of synthesis. Those ureas having R and $R_1$ equal to hydrogen, are synthesized by reaction of an aniline with an acid and an alkali metal cyanate (Equation 1) or by reaction of an aryl isocyanate with ammonia (Equation 2). Those in which $R_1$ is hydrogen and R is alkyl are synthesized by reaction of an aniline with an isocyanate (Equation 3) or by reaction of an aryl isocyanate with an amine (Equation 4). Those in which R and $R_1$ are both alkyl are synthesized by reaction of an aryl isocyanate with a dialkylamine (Equation 5) or by reaction of an aniline with a dialkylcarbamyl chloride (Equation 6).

(1)
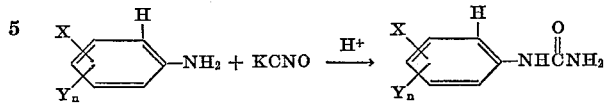

(2)
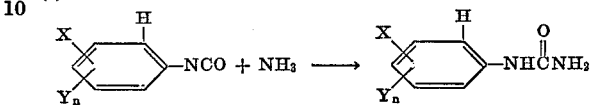

(3)
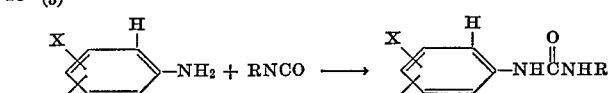

(4)
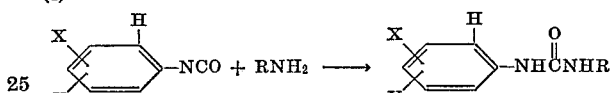

(5)
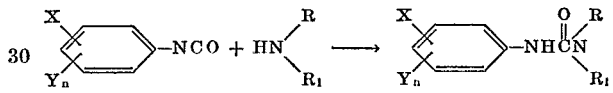

(6)
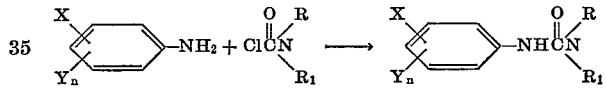

Exemplary of the useful ureas within the scope of Formula 1 are the following compounds.

m-fluorophenylurea
m-chlorophenylurea
p-bromophenylurea
1-(m-fluorophenyl)-3-methylurea
m-bromophenylurea
1-(m-bromophenyl)-3-ethylurea
p-chlorophenylurea
1-(p-bromophenyl)-3-methylurea
1-(2,4-dichlorophenyl)-3-methylurea
3,4-dichlorophenylurea
1-(3,5-dichlorophenyl)-3-methylurea
3,5-dichlorophenylurea
1-methyl-3-(m-trifluoromethylphenyl)urea
1-(p-chlorophenyl)-3-ethylurea
m-tolylurea
(3-chloro-4-methylphenyl)urea
1-(3-bromo-4-hydroxyphenyl)-3-methylurea
p-methoxyphenylurea
(3-chloro-4-nitrophenyl)urea
m-trifluoromethylphenylurea
1-(p-carboxyphenyl)-3-ethylurea
p-(methoxycarbonyl)phenylurea
p-(ethoxycarbonylmethyl)phenylurea
1-methyl-3-(3,4,5-trichlorophenyl)urea
1,1-dimethyl-3-(3,4,5-trichlorophenyl)urea
1-(3,5-dibromophenyl)-3,3-dimethylurea
1-(3,5-diiodophenyl)-3-methylurea
1-(3,4-dichlorophenyl)-3,3-dimethylurea
1-(m-chlorophenyl)-3-methylurea
1-(m-bromophenyl-3-methylurea
1-(p-chlorophenyl)-3-methylurea
1-(3,4-dichlorophenyl)-3-methylurea 1-(3,4-dichlorophenyl)-3-ethyl-3-methylurea
1-(3,4-dibromophenyl)-3,3-dimethylurea
1-(3,5-dichlorophenyl)-3,3-dimethylurea
1-(4-bromo-3-chlorophenyl)-3,3-dimethylurea
1-(4-bromo-3-methylphenyl)-3-methylurea
1-(3,5-dichloro-4-methylphenyl)-3-methylurea
1-(3,5-dichloro-4-methoxyphenyl)-3,3-dimethylurea
p-(ethoxycarbonyl)phenylurea
p-(methoxycarbonylmethyl)phenylurea
m-ethylphenylurea
1-n-butyl-3-(3,4-dichlorophenyl)-1-methylurea The compounds of this invention are used to increase the yield of plants, for example grape plants, by increasing the number and size of fruit set. They should be applied to the florets or foilage, or both, at the time of anthesis. Preferably, the applications are made two or three times, spaced at approximately weekly intervals beginning at early anthesis. For plants that bloom over an extended period, the number of applications may be increased or the application or applications timed to correspond to the time of maximum bloom and/or fruit set. The rates of applications vary from 50 to 2,000 p.p.m., depending on the time, method of application and the crop. For floral dips, the lower rates are preferred, while the higher rates are employed for overall sprays. For floral dips the preferred rates are 50 to 500 p.p.m., while 500 to 2,000 p.p.m. are preferred for the spray applications.

Compositions

Compositions of this invention are formulated by mixing a compound of this invention with one or more surface active agents.

The surface active agents used in this invention can be wetting, dispersing or emulsifying agents. They may act as wetting agents for wettable powders and dusts, as dispersing agents for wettable powders and suspensions and as emulsifying agents for emulsifiable concentrates. Surfactants also enhance the biological activity of the compounds of this invention. Such surface active agents can include such anionic, cationic and nonionic agents as have heretofore been generally employed in plant control compositions of similar type. Suitable surface active agents are set out, for example, in "Detergents and Emulsifiers, 1968 Annual" by John W. McCutcheon, Inc. Other surface active agents not listed by McCutcheon but still effective dispersants by virtue of protective colloid action include methyl cellulose, polyvinyl alcohol, hydroxyethylcellulose, and alkyl substituted polyvinyl pyrrolidones.

Suitable surface active agents for use in compositions of this invention include polyethylene glycol esters with fatty and rosin acids, polyethylene glycol ethers with alkyl phenols or with long-chain aliphatic alcohols, polyethylene glycol ethers with sorbitan fatty acid esters, and polyoxyethylenethio ethers. Other suitable surfactants include amine, alkali and alkaline earth salts of alkyl aryl sulfonic acids, amine, alkali and alkaline earth fatty alcohol sulfates, dialkyl esters of alkali metal sulfosuccinates, fatty acid esters of amine, alkali and alkaline earth isethionates and taurates, amine, alkali and alkaline earth salts of lignin sulfonic acids, methylated or hydroxyethylated cellulose, polyvinyl alcohols, alkyl substituted polyvinyl pyrrolidone, amine, alkali and alkaline earth salts of polymerized alkylnaphthalene sulfonic acids, and long-chain quaternary ammonium compounds. Anionic and nonionic surface active agents are preferred.

Among preferred wetting agents are sodium alkyl naphthalene sulfonates, sodium dioctylsulfosuccinate, sodium dodecylbenzene sulfonate, ethylene oxide condensates with alkylated phenols such as octyl, nonyl and dodecyl phenol, sodium lauryl sulfate, and trimethylnonyl polyethylene glycols. Among preferred dispersing agents are sodium, calcium and magnesium lignin sulfonates, low-viscosity methyl cellulose, low-viscosity polyvinyl alcohol, alkylated polyvinyl pyrrolidone, polymerized alkyl naphthalene sulfonates, sodium N-oleyl or N-lauryl isethionates, sodium N-methyl-N-palmitoyl taurate and dodecylphenol polyethylene glycol esters.

Among preferred emulsifying agents are ethylene oxide adducts of lauric, oleic, palmitic or stearic acid esters of sorbitan or sorbitol, polyethylene glycol esters with lauric, oleic, palmitic, stearic or rosin acids, oil-soluble alkylarylsulfonates, oil-soluble polyoxyethylene ethers with octyl, nonyl and dodecylphenol, polyoxyethylene adducts to long-chain alcohols or mercaptans, and mixtures of these surfactants.

Compositions of this invention will contain, in addition to surface active agents, solid or liquid diluents to produce wettable powders, dusts or emulsifiable liquids as desired.

Wettable powders

Wettable powders are compositions which usually contain inert solid diluents in addition to surfactants. These inert diluents may serve several purposes. They can act as grinding aids to prevent mill smear and screen blinding, they can aid rapid dispersion of the mix when placed in water, they can adsorb liquid or low melting solid active material to produce a free flowing solid product, they can prevent agglomeration into lumps upon prolonged hot storage and they can permit preparation of compositions with a controlled amount of active ingredient so that proper dosage is easily measured by the consumer.

Suitable diluents may be either inorganic or organic in origin. These include the natural clays, diatomaceous earth, synthetic mineral fillers derived from silica or silicates, insoluble salts produced by precipitation in fluffy form such as tricalcium phosphate or calcium carbonate, and powdered organic diluents such as shell flours, wood flours, corn cob flour or sucrose. Preferred fillers for the compositions of this invention include kaolin clays, attapulgite clay, non-swelling calcium magnesium montmorillonites, synthetic silicas, synthetic calcium and magnesium silicates, diatomaceous silica, corn cob flour and sugar.

Wettable powders will normally contain both a wetter and a dispersant. Most preferred for dry wettable powders are those anionic and nonionic surfactants which exist in solid form. Occasionally a liquid, nonionic surfactant, normally considered an emulsifying agent can be used to produce both wetting and dispersion.

Wetting and dispersing agents in wettabe powders of this invention, when taken together, will comprises from about 0.5 to weight percent to 5.0 weight percent of the total composition. The active component will be present at a concentration of from about 25% to 80% and diluent makes up the balance to 100%. Where needed a corrosion inhibitor or foaming inhibitor may be added at rates of 0.1% to 1.0% with a corresponding reduction in diluent.

Dusts

Dust compositions are those intended for application in dry form with suitable dusting equipment. Since wind drift is undesirable when applying dusts, the most suitable dust diluents are those which are dense and rapid settling. These include kaolinites, talcs, pyropyllites, ground phosphate rock, Serecite, and ground tobacco stems. However, dusts are usually most easily prepared by diluting an existing high-strength wettable powder with a dense diluent so that the final dust will frequently contain a fraction of light, absorptive diluent as well as the more desirable dense filler.

A wetting agent is desirable in dust formulations so that adhesion to dew-covered foliage is enchanced. Dusts made from wettable powders will usually contain sufficient wetter, but dusts made directly from unformulated active will usually contain an added wetting agent. Dry solid anionic or nonionic wetters are preferred.

Dust formulations will normally contain from 5.0 weight percent to 25 weight percent of active material, from 0.005% to 1.0% wetting agent, and from 3% to 20% light grinding aid diluent and the balance dense, rapid settling diluent. If made by diluting a prepared wettable powder it will also contain a small amount of dispersing agent which has no active role when the composition is used as a dry dust.

Emulsifiable liquids

Emulsifiable liquids are formulated by combining the compounds of this invention with a suitable emulsifier and an organic liquid with low water solubility. The active component may be completely dissolved in the organic liquid or it may be a finely ground suspension in a nonsolvent liquid. Suitable organic liquids include alkylated naphthalenes, xylene, high molecular weight ketones, such as isophorones, dibutyl or diamyl ketone, esters such as amyl acetate and normal or iso paraffins. Most preferred emulsifiers are blends of oil soluble sulfonates and nonionic polyoxyethylene glycol esters or ethers of fatty acids or alkylated phenols.

The active component in emulsifiable concentrates will be present at from 10 weight percent to about 40 weight percent. Combined emulsifiers will be present at from 3 weight percent to about 10 weight percent and the balance will be an organic carrier liquid or solvent.

Aqueous dispersions

The compounds of this invention may also be prepared as aqueous dispersion concentrates which have advantages over wettable powders in that amounts may be measured by volume rather than by weight and high concentrations of active can be obtained in liquid form without excessively high viscosity. This makes such compositions particularly suitable for ultra low volume application.

Aqueous dispersions are made most satisfactorily by combining the acitve with a dispersant and anti-claying agent in water and subjecting the composition to pebble milling or sand milling until the desired active particle size is attained. If anti-free characteristics are needed, part of the water can be replaced by glycols or glycerine to lower the freezing point. Such components also reduce the evaporation rate of water from droplets being applied from the air in ultra low volume application.

Suitable dispersants for such suspension concentrates include the lignin sulfonates, polymerized alkyl naphthalene sulfonates, polyvinyl alcohol, alkyl substituted polyvinyl-pyrrolidones, methyl cellulose and some polyethylene oxide condensates with nonyl and dodecylphenol.

Suitable anticlaying agents, which prevent bottom caking in storage include swelling bentonites, hydrated attapulgite, polyacrylic acid salts, polyacrylamides, and, under specialized circumstances methyl cellulose, which is normally a dispersant and not an anticlaying agent. The selection depends upon the active agent used and the nature of the continuous medium, whether it be water or some antifreeze mixture.

It is often advantageous to combine the compounds of the invention with gibberellic acid for application to fruits, especially grapes. The combination of 100–500 p.p.m. of the phenylurea and 10–80 p.p.m. of gibberellic acid provides a useful composition for application to grapes and other fruits.

The invention will now be exemplified by the following examples, in which parts by weight are used unless otherwise indicated.

EXAMPLE 1

| | Percent |
|---|---|
| 1-(3-bromophenyl)-3-methylurea | 50 |
| Sodium alkylnaphtalene sulfonate | 1.5 |
| Calcium lignin sulfonate | 1.0 |
| Attapulgite clay | 47.5 |

The above components are blended, then micropulverized to produce particles essentially all below 20 microns.

Any of the compounds of this invention may be substituted for the active in the above formulation to form dispersible, wettable powders.

A suspension containing 500 p.p.m. of 1-(3-bromophenyl)-3-methylurea formulated as above and 0.25% "Tween 20" wetting agent (polyethylene sorbitan monolaurate) is prepared. This solution is applied to Fredonia grape plants by spraying the whole plant including flowers to the point of runoff at anthesis. This treatment is repeated at weekly intervals for two more applications. The treatments result in a marked increase in fruit set on the treated vines. As a result they give a substantially higher yield of grapes than nearby similar untreated vines.

EXAMPLE 2

| | Percent |
|---|---|
| 1-(m-chlorophenyl)-3-methylurea | 80 |
| Sodium lauryl sulfate | 1 |
| Low viscosity methyl cellulose | 0.5 |
| Synthetic fine silica | 18.5 |

The above composition is mixed and milled as described in Example 1, then air milled to further reduce particle size.

The active in the above wettable powder can be replaced by the following to give satisfactory wettable powders 1-(3-bromophenyl)-3-methylurea
1-(3-chlorophenyl)-3-ethylurea
1-(4-hydroxyphenyl)-3-methylurea.

A suspension containing 200 p.p.m. of 1-m-chlorophenyl)-3-methylurea formulated as described above and containing 0.5% of B–1956 wetting agent (modified phthalic glycerol alkyl resin), is prepared. Developing Fredonia grape flowers are covered with this solution by dipping, spraying or smearing it on them. This treatment is repeated five days later. This treatment results in a larger set of grapes and more large-sized bunches on the treated plants. Consequently, more grapes are harvested from the treated vines than from similar untreated plants.

EXAMPLE 3

| | Percent |
|---|---|
| 1-(3,5-dichlorophenyl)-3-methylurea | 70 |
| Sodium dioctylsulfosuccinate | 1.5 |
| Alkylated polyvinylpyrrolidone | .5 |
| Kaolin clay | 24.0 |
| Swelling bentonite | 4.0 |

The above composition is blended, then double micropulverized and reblended.

A suspension containing 100 p.p.m. of the 1-(3,5-dichlorophenyl)-3-methylurea and 0.25% "Triton B–1956" wetting agent (modified phthalic glycerol alkyl resin) when applied to Elberta peaches at weekly intervals for three applications beginning at anthesis results in larger peaches.

A suspension containing 1 kg. of 1-(3,5- dichlorophenyl)-3-methylurea and 0.4% of B–1956 wetting agent in 100 l. of water is prepared and sprayed on a hectare of paddy rice approximately four weeks after anthesis. A helicopter is used to make the application and this treatment results in an increase in grain yield over the untreated portion of the field.

EXAMPLE 4

| | Percent |
|---|---|
| 1-(m-fluorophenyl)-3-methylurea | 10 |
| Attapulgite clay | 10 |
| Sodium alkyl naphthalene sulfonate | 0.5 |
| Micaceous talc | 79.5 |

The first three components are first blended and micropulverized, then reblended with the talc to form a dust.

A suspension of 0.5 kg. of the 1-(m-fluorophenyl)-3-methylurea dust and 0.5% "Tween 20" in 200 l. of water is prepared and sprayed on a hectare of silage corn one week after full tassel. This treatment is repeated at weekly intervals for a total of three treatments. These treatments result in a higher yield in terms of dry weight and total digestible nutrients compared to a similar hectare of untreated corn.

A suspension containing 500 p.p.m. of 1-(m-fluorophenyl)-3-methylurea and 0.2% "Tween 20" wetting agent (polyethylene sorbitan monolaurate) is applied to blueberry plants at anthesis. A second application is made ten days later. The treatment results in an increase in fruit set and an improvement in the yield of fruit.

EXAMPLE 5

|  | Percent |
|---|---|
| Wettable powder of Example 3 | 7.65 |
| Pyrophyllite | 92.35 |

The above components are blended together to yield a 5% active dust.

Ten kilograms of this dust are applied to a hectare of strawberries when they are in early flower. This treatment increases the fruit set of the plants and results in a larger yield from the treated plants.

What is claimed is:

1. A method for improving the yield of fruits from plants comprising applying to said plants at anthesis a growth regulating amount of a phenylurea of the formula:

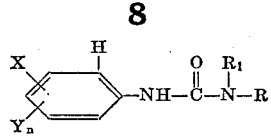

wherein

X is hydrogen, halogen, alkyl of 1 through 2 carbon atoms, hydroxy, alkoxy of 1 through 2 carbon atoms, trifluoromethyl, carboxy, alkoxycarbonyl of 2 through 3 carbon atoms, or alkoxy carbonylmethyl of 3 through 4 carbon atoms;

Y is hydrogen, bromine, chlorine, iodine, methyl or nitro;

$n$ is 1 or 2;

R is hydrogen or alkyl of 1 through 4 carbon atoms; and $R_1$ is hydrogen or methyl.

2. The method of claim 1 wherein $R_1$ is methyl.

3. The method of claim 1 wherein $R_1$ is methyl, $n$ is 1, at least one of X and Y is other than hydrogen and X and Y are in the 3 and 5 positions of the phenyl ring.

4. The method of claim 1 wherein $R_1$ is methyl, $n$ is 1, X and Y are other than hydrogen and X and Y are in the 3 and 5 positions of the phenyl ring.

References Cited

UNITED STATES PATENTS 3,469,965   9/1969   Bruce _____ 71—68

JAMES O. THOMAS, JR., Primary Examiner